United States Patent
Fujii et al.

(10) Patent No.: US 10,346,262 B2
(45) Date of Patent: Jul. 9, 2019

(54) JOB MANAGEMENT APPARATUS, JOB MANAGEMENT METHOD AND COMPUTER READABLE MEDIUM TO GENERATE AND EXECUTE A RETRY JOB WHEN AN ERROR OCCURS DURING A JOB STEP

(71) Applicant: MITSUBISHI ELECTRIC CORPORATION, Tokyo (JP)

(72) Inventors: Yuki Fujii, Tokyo (JP); Hideya Shibata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/749,044

(22) PCT Filed: Sep. 18, 2015

(86) PCT No.: PCT/JP2015/076649
§ 371 (c)(1),
(2) Date: Jan. 30, 2018

(87) PCT Pub. No.: WO2017/046939
PCT Pub. Date: Mar. 23, 2017

(65) Prior Publication Data
US 2018/0217901 A1 Aug. 2, 2018

(51) Int. Cl.
*G06F 11/00* (2006.01)
*G06F 11/14* (2006.01)
(Continued)

(52) U.S. Cl.
CPC .......... *G06F 11/1474* (2013.01); *G06F 9/485* (2013.01); *G06F 11/1461* (2013.01); *G06F 11/3065* (2013.01); *G06F 11/1438* (2013.01)

(58) Field of Classification Search
CPC ............. G06F 11/1407; G06F 11/1461; G06F 11/1474; G06F 9/485
See application file for complete search history.

(56) References Cited

U.S. PATENT DOCUMENTS

| | | |
|---|---|---|
| 5,321,835 A | 6/1994 | Tanaka et al. |
| 5,826,078 A | 10/1998 | Funaki |
| | (Continued) | |

FOREIGN PATENT DOCUMENTS

| | | |
|---|---|---|
| JP | 3-188528 A | 8/1991 |
| JP | 6-59913 A | 3/1994 |
| | (Continued) | |

OTHER PUBLICATIONS

Office Action dated Aug. 22, 2018 in corresponding Chinese Application No. 201580082799.6.

*Primary Examiner* — Elmira Mehrmanesh
(74) *Attorney, Agent, or Firm* — Birch, Stewart, Kolasch & Birch, LLP

(57) ABSTRACT

In a job management apparatus, a reception part receives an input of definition information that defines a running sequence and a running condition of a plurality of job steps. If an abnormal end occurs in a job step included in a job run by the apparatus in accordance with the definition information, the apparatus runs a retry job including a restarting step, which is the job step in which the abnormal end has occurred, and a job step posterior to the restarting step in the running sequence defined by the definition information and satisfying the running condition defined by the definition information at the occurrence of the abnormal end in the restarting step. The apparatus stops running the restarting step and the job step posterior to the restarting step in the running sequence defined by the definition information at least until the run of the retry job is completed.

11 Claims, 17 Drawing Sheets

(51) Int. Cl.
*G06F 9/48* (2006.01)
*G06F 11/30* (2006.01)

(56) References Cited

U.S. PATENT DOCUMENTS

| | | | |
|---|---|---|---|
| 6,041,425 A | 3/2000 | Kokunishi et al. | |
| 6,636,884 B2* | 10/2003 | Iida | G06F 8/456 714/6.32 |
| 7,093,251 B2* | 8/2006 | Tsun | G06F 9/4843 709/224 |
| 7,269,607 B2* | 9/2007 | Cotner | G06F 11/1471 |
| 7,516,458 B2* | 4/2009 | Babutzka | G06F 9/5038 718/102 |
| 2004/0267877 A1* | 12/2004 | Shapiro | G06F 17/30067 709/202 |
| 2006/0294507 A1* | 12/2006 | Buskens | G06F 9/5066 717/133 |
| 2008/0163219 A1* | 7/2008 | Marwinski | G06F 9/4881 718/101 |
| 2009/0083746 A1* | 3/2009 | Katsumata | G06F 9/485 718/103 |
| 2011/0296425 A1 | 12/2011 | Fukuda et al. | |
| 2014/0297355 A1* | 10/2014 | Ohashi | G06Q 10/06316 705/7.26 |
| 2015/0074672 A1* | 3/2015 | Yeddanapudi | H04L 47/11 718/103 |
| 2016/0011906 A1* | 1/2016 | Chin | G06F 9/485 718/104 |
| 2017/0063615 A1* | 3/2017 | Yang | H04L 41/0806 |

FOREIGN PATENT DOCUMENTS

| | | |
|---|---|---|
| JP | 6-103078 A | 4/1994 |
| JP | 7-5907 A | 1/1995 |
| JP | 8-227368 A | 9/1996 |
| JP | 8-272626 A | 10/1996 |
| JP | 10-78894 A | 3/1998 |
| JP | 2809271 B2 | 10/1998 |
| JP | 11-353284 A | 12/1999 |
| JP | 2002-328810 A | 11/2002 |
| JP | 2004-164271 A | 6/2004 |
| JP | 2006-103151 A | 4/2006 |
| JP | 2009-169579 A | 7/2009 |
| JP | 2009-181497 A | 8/2009 |
| JP | 2009-282577 A | 12/2009 |
| JP | 2011-248724 A | 12/2011 |

* cited by examiner

Fig. 4

```
[jobstep]
jobstepid = jobstep01
command = load DATA FILE to ACCUMULATION TABLE
priority = 1
interval = 5minute

[jobstep]
jobstepid = jobstep02
command = incremental backup ACCUMULATION TABLE
priority = 1
interval = 1day
category = backup

[jobstep]
jobstepid = jobstep03
command = extract from ACCUMULATION TABLE
interval = 1hour

[jobstep]
jobstepid = jobstep04
command = load to TEMPORARY REFERENCE TABLE
interval = 1hour
category = part of transaction

[jobstep]
jobstepid = jobstep05
command = incremental backup TEMPORARY REFERENCE TABLE
interval = 1day
category = backup

[jobstep]
jobstepid = jobstep06
command = extract nondeficit data from TEMPORARY REFERENCE TABLE
interval = 1day (CONTINUE)
```

[jobstep]
jobstepid = jobstep07
command = load nondeficit data to REFERENCE TABLE
priority = 1
interval = 1day
category = part of transaction

[jobstep]
jobstepid = jobstep08
command = incremental backup REFERENCE TABLE
interval = 1day
category = backup

[jobstep]
jobstepid = jobstep09
command = extract deficit data from TEMPORARY REFERENCE TABLE
interval = 2day

[jobstep]
jobstepid = jobstep10
command = truncate TEMPORARY REFERENCE TABLE
interval = 2day
category = part of transaction

[jobstep]
jobstepid = jobstep11
command = load deficit data to TEMPORARY REFERENCE TABLE
interval = 2day
category = part of transaction (CONTINUE)
```
111

[jobstep]
jobstepid = jobstep12
command = incremental backup TEMPORARY REFERENCE TABLE
interval = 2day
category = part of transaction

[category]
category = backup
retry type = after other category

[category]
category = part of transaction
retry type = negative (END)
```

```
jobstepid = jobstep11
jobstepid = jobstep12
```
221

Fig. 14

| JOB STARTUP DAY AND TIME | RESULT OF RUN OF JOB STEP (NORMAL END/ABNORMAL END/SKIP) | | | | | |
|---|---|---|---|---|---|---|
| | jobstep 01 | jobstep 02 | jobstep 03 | jobstep 04 | jobstep 05 | ... |
| ... | ... | ... | ... | ... | ... | ... |
| 10/01 22:55 | NORMAL END | SKIP | SKIP | SKIP | SKIP | ... |
| 10/01 23:00 | NORMAL END | SKIP | NORMAL END | NORMAL END | SKIP | ... |
| 10/01 23:05 | NORMAL END | SKIP | SKIP | SKIP | SKIP | ... |
| ... | ... | ... | ... | ... | ... | ... |
| 10/01 23:55 | NORMAL END | SKIP | SKIP | SKIP | SKIP | ... |
| 10/02 00:00 | NORMAL END | NORMAL END | NORMAL END | NORMAL END | NORMAL END | ... |
| 10/02 00:05 | NORMAL END | SKIP | SKIP | SKIP | SKIP | ... |
| ... | ... | ... | ... | ... | ... | ... |
| 10/02 23:55 | NORMAL END | SKIP | SKIP | SKIP | SKIP | ... |
| 10/03 00:00 | NORMAL END | NORMAL END | NORMAL END | NORMAL END | NORMAL END | ... |
| ... | ... | ... | ... | ... | ... | ... |

Fig. 15

| JOB STARTUP DAY AND TIME | RESULT OF RUN OF JOB STEP (NORMAL END/ABNORMAL END/SKIP) | | | | |
|---|---|---|---|---|---|
| | jobstep 01 | ... | jobstep 05 | ... | jobstep 12 |
| 10/02 00:00 | NORMAL END | ... | NORMAL END | ... | NORMAL END |
| ... | ... | ... | ... | ... | ... |
| 10/03 00:00 | NORMAL END | ... | NORMAL END | ... | SKIP |
| 10/03 00:05 | ABNORMAL END | ... | SKIP | ... | SKIP |
| 10/03 00:10 (RETRY RUN) | NORMAL END | ... | NORMAL END | ... | SKIP |
| 10/04 00:00 | NORMAL END | ... | SKIP | ... | NORMAL END |

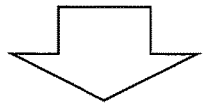

| JOB STARTUP DAY AND TIME | RESULT OF RUN OF JOB STEP (NORMAL END/ABNORMAL END/SKIP) | | | | |
|---|---|---|---|---|---|
| | jobstep 01 | ... | jobstep 05 | ... | jobstep 12 |
| 10/02 00:00 | NORMAL END | ... | NORMAL END | ... | NORMAL END |
| ... | ... | ... | ... | ... | ... |
| 10/03 00:00 | NORMAL END | ... | NORMAL END | ... | SKIP |
| 10/03 00:05 | ABNORMAL END | ... | SKIP | ... | SKIP |
| 10/03 00:10 (RETRY RUN) | NORMAL END | ... | NORMAL END | ... | SKIP |
| 10/04 00:00 | NORMAL END | ... | SKIP | ... | SKIP |

```
jobstepid = jobstep03
jobstepid = jobstep04
jobstepid = jobstep05
jobstepid = jobstep06
jobstepid = jobstep08
jobstepid = jobstep09
```
221

```
jobstepid = jobstep03
jobstepid = jobstep04
jobstepid = jobstep06
jobstepid = jobstep09
jobstepid = jobstep02
jobstepid = jobstep05
jobstepid = jobstep08
```
221

JOB MANAGEMENT APPARATUS, JOB MANAGEMENT METHOD AND COMPUTER READABLE MEDIUM TO GENERATE AND EXECUTE A RETRY JOB WHEN AN ERROR OCCURS DURING A JOB STEP

TECHNICAL FIELD

The present invention relates to a job management apparatus, a job management method and a job management program.

BACKGROUND ART

There is a job management technology for running a batch process that includes a plurality of processes to be run according to an sequential order defined in advance by a user periodically or irregularly in a repeated manner. The batch process is referred to as a "job". Individual processes which constitute the job are referred to as a "job step".

In a certain job management technology (for example, see Patent Literature 1), the user is allowed to set an interval between runs for each job step in the job in order to skip job steps which are not necessary to be run every time. In other words, when running a job, running only job steps which have not been run for periods equal to or more than intervals defined by the user since previous times of run is possible.

It is assumed that there is a job including a job step for loading data into a table in a database, and a job step for taking a backup of the table. If the backup is taken every time in this job, running time of each job is increased. With the above-described technology, however, the backup may be set to be taken only once a day.

Two objects as describe below are conceivable for the job management technology which enables setting of intervals between runs.

A first object is, if one of two job steps specified by a user ends abnormally, to maintain the job step in a state of abnormal end so as to allow a retry run at a given timing while establishing a dependency relation therebetween. The dependency relation includes a first dependency relation in which whenever a preceding job step is run in a certain job, a following job step is also run. Alternatively, there is a second dependency relation in which whenever a following job step is run in a certain job, running of a preceding job step has already been completed. If the first object is achieved, safety of the system to which the job management technology is applied is ensured.

For example, it is assumed that there is a job including a job step for extracting data from a table in a database and overwrite the data in the temporary file and a job step for loading the extracted data in another table. In this job, if the job step for data extraction has been run but the subsequent job step for data loading is skipped, a problem of data loss may occur such that the extracted data remaining in the temporary file without being loaded in the another table is erased when a job step for data extraction in a subsequently started job is run. Alternatively, if an abnormal end occurs in the job step for data loading and the job step for data extraction in a subsequently started job is run, a problem may arise such that data failed to be loaded is erased. Therefore, it is necessary not to run the job step for data extraction until a retry run of the job step for data loading is ended normally, and to maintain the state of abnormal end of the job step for data loading while establishing the first dependency relation.

As another example, it is assumed that there is a system having two tables; an accumulation table in which data collected regularly is loaded and a reference table which stores data extracted from the accumulation table and processed. In this system, a job in which five job steps are run in sequence; a job step for loading data in the accumulation table, a job step for running backup of the accumulation table, a job step for extracting data from the accumulation table and overwriting the data in the temporary file, a job step for loading the extracted data into the reference table, and a job step for taking a backup of the reference table is run repeatedly. In this job, consistency between the backup of the accumulation table and the backup of the reference table is maintained by establishing the second dependency relation in which whenever backup of the reference table is run, backup of the accumulation table has already been completed. Therefore, at the time of data restoration, time required for restoring is shortened by restoring the accumulation table and the reference table in parallel. In addition, safety of the system is also enhanced.

As a technology relating to the first object, Patent Literature 1 discloses a method of expressing a dependency relation between job steps only by setting intervals between runs. Patent Literature 2 discloses a method of making a user set a dependency relation between job steps explicitly in addition to the setting of the intervals between runs.

A second object is that if an abnormal end occurs in a certain job step, repeated runs of some job steps before the abnormally ended job step is continued. If this object is achieved, availability of the system to which the job management technology is applied is improved.

As a technology relating to the second object, Patent Literature 3 discloses a method of specifying an abnormally ended job step and executing a retry run.

CITATION LIST

Patent Literatures

Patent Literature 1: JP 6-59913 A
Patent Literature 2: JP 2009-282577 A
Patent Literature 3: JP 8-227368 A

SUMMARY OF INVENTION

Technical Problem

In the related art, if a job step following an abnormally ended job step and a job step preceding the abnormally ended job step have a dependency relation, inconsistency arises between states of these two job steps. For example, a job that runs loading of data in a first table, backup of the first table, data extraction from the first table, loading of the extracted data into a second table, and backup of the second table in sequence is assumed to be repeatedly run. It is assumed that the backup of the first table and the backup of the second table have a second dependency relation. It is assumed that in a certain job, backup of the first table has been run, and then an abnormal end occurred in data extraction from the first table. It is assumed that subsequently, data loading into the first table was continuously repeated. If a retry run is executed automatically by the method of the related art (for example, see Patent Literature 3), the job is restarted from data extraction from the first table, and then loading of the extracted data into the second table and backup of the second table will follow. However, the backup of the second table to be taken at the time of retry run includes the data loaded in the first table after the abnormal end of data extraction from the first table. Therefore, a problem of inconsistency between the backup of the second table and the backup of the first table taken when the data extraction from the first table has been abnormally ended may occur. In this manner, in the related art, both of the first and second objects described above may not be achieved simultaneously.

It is an object of the present invention to continue a repeated run of a job if a job step following an abnormally ended job step and a job step preceding the abnormally ended job step have the dependency relation within a range that does not cause inconsistency between states of these two job steps. In other words, it is an object of the present invention to achieve both of the first and second objects described above. The first object is given priority over the second object.

Solution to Problem

A job management apparatus according to one aspect of the present invention includes:

an execution part to run a job with using a processor;

a reception part to receive an input of definition information that defines a running sequence and a running condition of a plurality of job steps which correspond to components of the job to be run by the execution part; and a control part to, if an abnormal end occurs in a job step included in a job run by the execution part in accordance with the definition information, make the execution part stop running a restarting step being the job step in which the abnormal end has occurred and a job step posterior to the restarting step in the running sequence defined by the definition information.

Advantageous Effects of Invention

According to the present invention, even when certain two job steps have the dependency relation, if an abnormal end occurs in the following job step, repeated runs of the job may be continued from the next job onward within a range that does not cause inconsistency in the state of these two job steps according to definition information. Therefore, availability of the system to which the apparatus or the like of the present invention is applied may be ensured while ensuring the safety of the same.

BRIEF DESCRIPTION OF DRAWINGS

FIG. 4 is a drawing illustrating an example of definition information input to the job management apparatus according to the first embodiment.

FIG. 5 is a drawing illustrating an example of the definition information input to the job management apparatus according to the first embodiment.

FIG. 6 is a drawing illustrating an example of the definition information input to the job management apparatus according to the first embodiment.

FIG. 7 is a drawing illustrating an example of a retry job generated by the job management apparatus according to the first embodiment.

FIG. 14 is a table illustrating an example of results of runs of a job by the job management apparatus according to the first embodiment.

FIG. 15 is a table illustrating an example of the results of runs of a job by the job management apparatus according to the first embodiment.

DESCRIPTION OF EMBODIMENT

Figure 1:
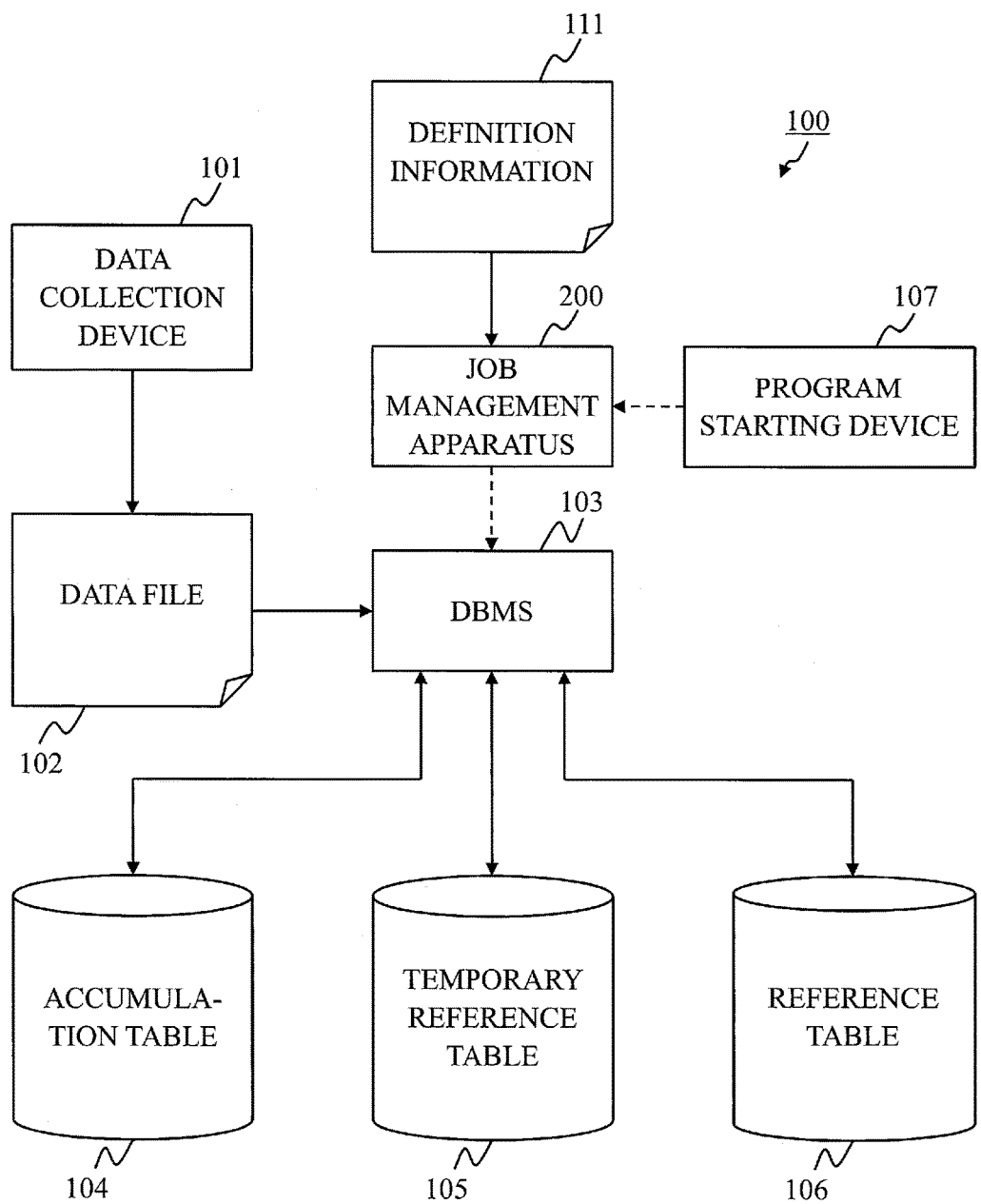
FIG. 1 is a block diagram illustrating a configuration of a data management system according to a first embodiment.

Referring now to the drawings, an embodiment of the present invention will be described below. In the drawings, the same or corresponding parts are denoted by the same reference numerals. In the description of the embodiment, description of the same or corresponding parts are omitted or simplified as needed.

First Embodiment

Configurations of a system and an apparatus according to the embodiment, actions of the apparatus of the embodiment, and advantageous effects of the embodiment will be described in sequence.

Description of Configurations

Referring now to FIG. 1, a configuration of a data management system 100, which is a system according to the embodiment will be described.

The data management system 100 executes a command of data loading in a database and a command of a backup of data with using a job management apparatus 200. Data may be arbitrary data, but is device data in this embodiment.

The data management system 100 includes a data collection device 101, a database management system (DBMS) 103, and a program starting device 107 in addition to the job management apparatus 200.

The data collection device 101 collects data from external devices of the data management system 100. The data collection device 101 outputs a data file 102 including collected data into an interior of the data management system 100. Note that collection of data and output of the collected data may be executed by the job management apparatus 200 instead of the data collection device 101.

Various commands for managing data that the DBMS 103 executes are defined by definition information 111 together with various running conditions. The commands and the running conditions may be defined in arbitrary forms, and in the embodiment, are described in a form of a job definition statement, that is, in a text format.

The program starting device 107 starts the job management apparatus 200 periodically. When the job management apparatus 200 is to be started may be scheduled by the job management apparatus 200 instead of the program starting device 107. The job management apparatus 200 does not necessarily have to be started periodically, and may be started irregularly.

The job management apparatus 200, when started by the program starting device 107, reads the definition information 111. The job management apparatus 200 executes a command for data management of the DBMS 103 according to the definition information 111. Accordingly, the job management apparatus 200 outputs data of the data file 102 to an accumulation table 104, a temporary reference table 105, and a reference table 106.

Figure 2:
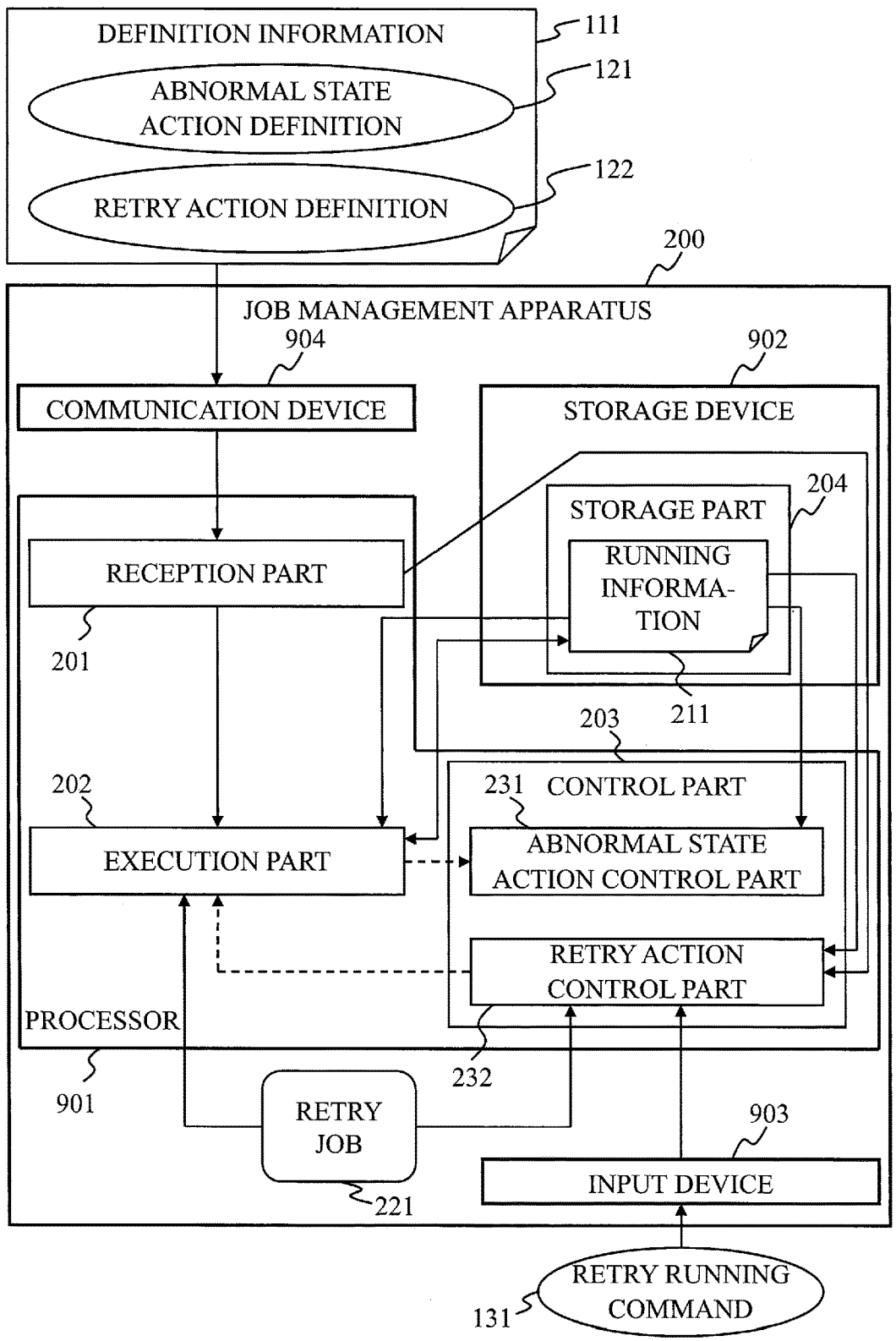
FIG. 2 is a block diagram illustrating a configuration of a job management apparatus according to the first embodiment.

Referring to FIG. 2, a configuration of the job management apparatus 200, which is an apparatus of the embodiment will be described.

The job management apparatus 200 includes a reception part 201, an execution part 202, a control part 203, and a storage part 204 for storing information.

In the embodiment, the job management apparatus 200 is a computer. Functions of the job management apparatus 200 are realized by software. The job management apparatus 200 includes hardware such as a processor 901, a storage device 902, an input device 903, and a communication device 904. The processor 901 is connected to other hardware via signal lines and controls these other hardware.

The processor 901 is an integrated circuit (IC) which executes processing. The processor 901 is specifically a central processing unit (CPU).

The storage device 902 includes an auxiliary storage device and a memory. The auxiliary storage device specifically includes a read only memory (ROM), a flash memory, or a hard disk drive (HDD). The memory is specifically a random access memory (RAM). The storage part 204 is realized by the storage device 902. The storage part 204 is realized specifically by the memory.

The input device 903 is specifically, a mouse, a keyboard, or a touch panel.

The job management apparatus 200 may be provided with a display as hardware.

The display is specifically a liquid crystal display (LCD).

The communication device 904 includes a receiver that receives data and a transmitter that transmits data. The communication device 904 is specifically a communication chip or a network interface card (NIC).

The auxiliary storage device stores a program for realizing functions of "parts" such as the reception part 201, the execution part 202, and the control part 203. The program is loaded in the memory, read in the processor 901, and is executed by the processor 901. The auxiliary storage device also stores operating system (OS). At least part of the OS is loaded in the memory, and the processor 901 executes the program that realizes the functions of "parts" while executing the OS.

The job management apparatus 200 may have one processor 901 only, or may have a plurality of the processors 901. The plurality of processors 901 may execute a program that realizes functions of the "parts" in cooperation.

Information illustrating a result of the processes in the "parts", data, signal values, and variable values are stored in the auxiliary storage device, the memory, or a register or a cache memory in the processor 901.

The program that realizes the functions of the "parts" may be stored in a portable storage media such as a magnetic disk, a flexible disk, an optical disc, a compact disc, a Blu-ray (registered trademark) disc, a digital versatile disc (DVD), and the like.

The reception part 201 accepts an input of the definition information 111. Specifically, the reception part 201 receives the definition information 111 from exterior of the job management apparatus 200 with using the communication device 904, and writes the definition information 111 in the storage device 902. The reception part 201 may accept an input of the definition information 111 with using the input device 903, and write the definition information 111 in the storage device 902.

The definition information 111 includes information for defining a running sequence and a running condition of a plurality of job steps which correspond to components of the job to be run by the execution part 202. An arbitrary running condition may be defined as the running condition of each job step, and in this embodiment, the interval between runs of each job step is defined.

In this embodiment, the definition information 111 further includes information as abnormal state action definition 121, which defines the job steps to be run even when abnormal end occurs in other job steps out of the plurality of job steps described above as priority steps.

In the embodiment, the definition information 111 further includes information as a retry action definition 122, which defines types of the plurality of job steps described above.

The execution part 202 runs the jobs with using the processor. The processor may be the processor 901 mounted on the job management apparatus 200, and in the embodiment, is a processor provided on the DBMS 103. In other words, the execution part 202 may run the job directly, and in the embodiment, runs the job indirectly by managing running of the jobs by the DBMS 103. Specifically, the execution part 202 starts the respective job steps as an external program, and receives the result of runs from the external program. As a method to do so, any method may be employed, and in the embodiment, a method of using application programming interface (API) that is provided by the OS is employed. As the API that starts the external program, Create Process may be used if the OS is Windows (registered trademark), and execlp or the like may be used if the OS is Unix (registered trademark). As the API that receives the result of runs from the external program, Get Exit Code Process may be used if the OS is Windows (registered trademark), and waitpid or the like may be used if the OS is Unix (registered trademark).

The control part 203 includes an abnormal state action control part 231 and a retry action control part 232 which will be described later.

When an abnormal end occurs in the job step included in the job run by the execution part 202 according to the definition information 111, the control part 203 generates a retry job 221, and makes the execution part 202 run the retry job 221. Specifically, when an abnormal end occurs in the job step included in a job which is being run according to the definition information 111, the execution part 202 notifies an exception to the processor 901. By the notification of the exception, a process of generating the retry job 221 is started, and the control part 203 generates the retry job 221 with using the processor 901 to deploy the retry job 221 in the memory. The execution part 202 runs the retry job 221 on the memory. The retry job 221 is a job including a restarting step being the job step in which the abnormal end has occurred and a job step posterior to the restarting step in the running sequence defined by the definition information 111 and satisfying the running condition defined by the definition information 111 at the occurrence of the abnormal end in the restarting step.

The control part 203 makes the execution part 202 stop running the restarting step and the job step posterior to the restarting step in the running sequence defined by the definition information 111 at least until the run of the retry job 221 is completed. In the embodiment, the control part 203 makes the execution part 202 stop running a job step anterior to the restarting step in the running sequence defined by the definition information 111 and not being defined as the priority step by the definition information 111 at least until the run of the retry job 221 is completed. Specifically, when a job according to the definition information 111 is being run, the execution part 202 acquires information for determining whether running of the job steps are to be stopped or not from the control part 203 for each of the job steps included in the job. The information is generated by the control part 203 based on run information 212, which will be described later, with using the processor 901. The control part 203 makes the execution part 202 stop running a desired job step by notifying the execution part 202 of information generated based on the run information 212 stored in the storage part 204.

Therefore, in the embodiment, if an abnormal end occurs in any of the plurality of job steps described above, even when running cycles of job steps anterior to the job step in which the abnormal end has occurred in the running sequence other than the priority steps have expired, running of the corresponding job steps is skipped. Such a state of omitting running of the job steps whose running cycles have expired is released if running of the retry job 221 is completed without occurrence of an abnormal end in the job steps included in the retry job 221.

In the embodiment, the control part 203 determines job steps to be included in the retry job 221 in accordance with the types defined by the definition information 111. Also, the control part 203 determines a running sequence of the job steps included in the retry job 221 in accordance with the types defined by the definition information 111. The running sequence of the job steps included in the retry job 221 is expressed by the sequential order of the job steps in the retry job 221. A specific method of determination of the job step to be included in the retry job 221 and a specific method of determination of the running sequence of job steps will be described later.

In the following description, an action to run a job according to the definition information 111 by the execution part 202 is referred to as a "normal action" of the job management apparatus 200, and an action to generate the retry job 221 by the control part 203 and run the retry job 221 by the execution part 202 is referred to as a "retry action" of the job management apparatus 200.

The retry action may be started automatically, and in the embodiment, is started when the user inputs a retry run command 131 that specifies a job and instructs a retry run of the job. The normal action is stopped during the retry action. However, periodical run of the normal action is continued until the retry action is started.

Figure 3:
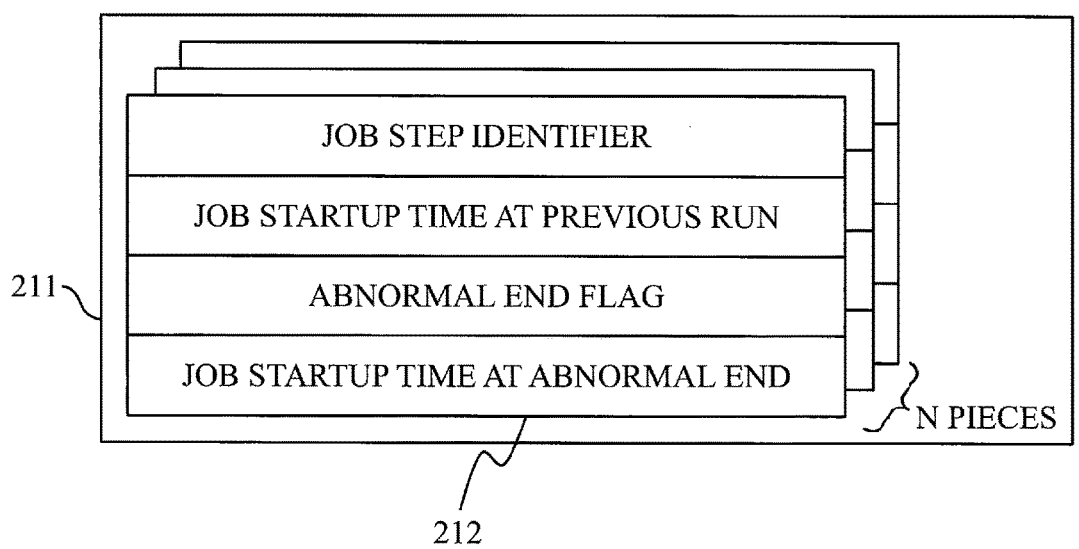
FIG. 3 is a drawing illustrating a content of run information held by the job management apparatus according to the first embodiment.

In the embodiment, the execution part 202 writes the run information 212 in the storage part 204 for each job step. The storage part 204 stores the run information 212, the number of pieces of which corresponds to the number of job steps, as job run information 211 as illustrated in FIG. 3. The run information 212 for each job step includes a job step identifier, job startup time at a previous run, an abnormal end flag, and job startup time at an abnormal end. The job step identifier is information for identifying job steps. The job startup time at the previous run is information that indicates time of the previous run of the job step. The abnormal end flag is information that indicates the occurrence or nonoccurrence of the abnormal end of the job step. The job startup time at the abnormal end is information that indicates the time of the occurrence of the abnormal end of the job step.

During the normal action, the execution part 202 runs a job step for which a time period equal to or more than the interval between runs defined by the definition information 111 has elapsed from the time of the previous run indicated by the run information 212 along the running sequence defined by the definition information 111. In other words, the execution part 202 runs a job step whose running cycle has expired along the running sequence. The execution part 202 updates the run information 212 with respect to the run job step. Specifically, the execution part 202 overwrites the time of the previous run indicated by the run information 212 of the run job step with startup time of the job being run.

In contrast, during the retry action, the execution part 202 runs the job steps included in the retry job 221 along the running sequence determined by the control part 203. Specifically, the execution part 202 runs the job steps included in the retry job 221 along the sequential order of the job steps in the retry job 221. At the end of the retry action, the execution part 202 changes the time of the previous run indicated by the run information 212 into common time, with respect to the plurality of job steps. In other words, the execution part 202 overwrites the time of the previous run indicated by the run information 212 of all the job steps with the same time.

During a normal action, if an abnormal end occurs in a certain job step, the execution part 202 updates the run information 212 with respect to the job step in which the abnormal end has occurred. Specifically, the execution part 202 changes the abnormal end flag included in the run information 212 of the job step in which the abnormal end has occurred to "on". In other words, the execution part 202 updates the run information 212 of the restarting step with information that indicates the occurrence of the abnormal end.

During the retry action, the execution part 202 updates the run information 212 with respect to the restarting step if no abnormal end occurs. Specifically, the execution part 202 changes the abnormal end flag included in the run information 212 of the restarting step to "off". In other words, the execution part 202 updates the run information 212 of the restarting step with information that indicates nonoccurrence of the abnormal end.

During the retry action, if there are multiple job steps for each of which the occurrence of the abnormal end is indicated by the run information 212, the control part 203 repeats a process of generating the retry job 221 and makes the execution part 202 run the retry job 221 until no job step for which the occurrence of the abnormal end is indicated by the run information 212 is left. The control part 203, when generating the retry job 221, determines a job step posterior in the running sequence defined by the definition information 111 first as the restarting step. In other words, the control part 203 includes the last job step in the running sequence defined by the definition information 111 out of the job steps for each of which the occurrence of the abnormal end is indicated by the run information 212 in the retry job 221 as the restarting step.

An example of the definition information 111 is illustrated in FIG. 4, FIG. 5, and FIG. 6 here.

The definition information 111 includes information for determining the running sequence of the job steps.

The definition information 111 includes job step identifiers and contents of command to be executed for the respective job steps.

In the embodiment, the abnormal state action definition 121 includes priority run flags for determining whether respective job steps should be run after an abnormal end of a certain job step. The priority run flags correspond to information which indicates whether the respective job steps are priority steps or not.

In the embodiment, the retry action definition 122 includes a job step category for sorting the job steps, and retry types for defining the retry actions for the respective job step categories. The retry type corresponds to the type of job step described above. As the job step categories that can be specified include "backup" and "part of transaction". For the job step category "backup", "after other category" and "negative" may be specified as the retry type. For the job step category "part of transaction", "negative" may be specified as the retry type. A procedure for generating the retry job 221 by the retry action control part 232 is determined for each combination of the job step category and the retry type. However, what types of retry may be specified, and how the retry job 221 is generated and altered for each retry type may be determined as needed.

In the example from FIG. 4 to FIG. 6, the job definition statements included in the definition information 111 include a plurality of jobstep sections and a plurality of category sections. In the jobstep section, information on job step to be run is described. The jobstep sections and the job steps are in one-to-one correspondence. The sequential order of the jobstep sections corresponds to the running sequence of the job steps.

The jobstep section includes a row in the form of "key"="value". The key includes a jobstepid key, a command key, an interval key, a priority key, and a category key. The jobstepid key is a key for defining the job step identifier. The command key is a key for defining the content of the command to be executed in the job step corresponding to the job step identifier. The interval key is a key for defining the interval between runs of the corresponding job step. The priority key is a key for determining whether the corresponding job step should be run after an abnormal end has occurred in another job step. The category key is a key for specifying the job step category of the job step.

The command key may be a key that specifies a command in an arbitrary form, and in the embodiment, specifies a command by having a name of the command that a command line interpreter provided in the OS can accept. The execution part 202 executes the command specified by the command key via the command line interpreter. The command line interpreter which may be used includes cmd.exe if the OS is Windows (registered trademark), and sh or the like if the OS is Unix (registered trademark). In the example from FIG. 4 to FIG. 6, in order to facilitate the description, pseudo commands are presented. Meanings of the respective pseudo commands will be described later.

When the jobstep section includes a row of "priority=1", a priority run flag of a job step corresponding to the jobstep section is "on".

The interval key includes an interval between runs of the job step specified thereto with a time unit. The interval between runs in the case of "interval=1 minute" is one minute. The interval between runs in the case of "interval=1 hour" is one hour. The interval between runs in a case of "interval=1 day" is one day.

The category section includes a row in a form of "key"="value". The key includes a category key and a retry type key. The category key is a key for specifying a job step category. The retry type key is a key for defining a retry type of the job step which belongs to the job step category.

As illustrated in FIG. 4, a first job step has a job step identifier of "jobstep01", and is a job step specified to execute a command for loading data of the data file 102 into the accumulation table 104 every five minutes.

A second job step has a job step identifier of "jobstep02", and is a job step specified to execute a command for taking an incremental backup of the accumulation table 104 every day.

A third job step has a job step identifier of "jobstep03" and is a job step specified to execute a command for extracting a difference from the accumulation table 104 and overwriting the difference in an intermediate file every hour. As used herein the term "difference" is intended to mean data loaded in the accumulation table 104 after the latest extraction of the difference.

A fourth job step has a job step identifier of "jobstep04" and is a job step specified to execute a command for loading the difference extracted by the third job step, that is, data in an intermediate file into the temporary reference table 105 every hour.

A fifth job step has a job step identifier of "jobstep05", and is a job step specified to execute a command for taking an incremental backup of the temporary reference table 105 every day.

A sixth job step has a job step identifier of "jobstep06" and is a job step specified to execute a command for extracting a non-missing record from the temporary reference table 105 and overwriting the non-missing record in an intermediate file every day.

As illustrated in FIG. 5, a seventh job step has a job step identifier of "jobstep07" and is a job step specified to execute a command for loading the non-missing record extracted by the sixth job step, that is, data in the intermediate file into the reference table 106 every day.

An eighth job step has a job step identifier of "jobstep08", and is a job step specified to execute a command for taking an incremental backup of the reference table 106 every day.

A ninth job step has a job step identifier of "jobstep09" and is a job step specified to execute a command for extracting a missing record from the temporary reference table 105 and overwriting the missing record in an intermediate file every two days.

A tenth job step has a job step identifier of "jobstep10", and is a job step specified to execute a command for deleting all the data in the temporary reference table 105 every two days.

An eleventh job step has a job step identifier of "jobstep11" and is a job step specified to execute a command for loading the missing record extracted by the ninth job step, that is, data in the intermediate file into the temporary reference table 105 every two days.

As illustrated in FIG. 6, a twelfth job step has a job step identifier of "jobstep12", and is a job step specified to execute a command for taking an incremental backup of the temporary reference table 105 every two days.

In the example illustrated in FIG. 4 to FIG. 6, intervals between runs for the respective job steps are set so as to achieve a consistency of backup among the backups of the accumulation table 104, the temporary reference table 105, and the reference table 106. Specifically, an interval between runs of the second job step, an interval between runs of the fifth job step, and an interval between runs of the eighth job step are set to be the same. Also, an interval between runs of the twelfth job step is set to be double the intervals between runs of the second job step and the eighth job step. Accordingly, in the job run in a certain cycle, the consistency of backup is achieved even when the increment backup of the temporary reference table 105 is taken in the fifth job step, and then the tenth job step and the eleventh job step are run, and the data in the temporary reference table 105 is updated.

As illustrated in FIG. 6, a retry type "after other category" is specified for a job step category "backup".

In this manner, in the embodiment, the type defined by the definition information 111 for the job step whose data is to be backed up among the plurality of job steps is sorted as a common type "after other category".

The control part 203 includes a job step anterior to the restarting step in the running sequence defined by the definition information 111 and whose type defined by the definition information 111 is the common type "after other category" in the retry job 221.

The control part 203 places a job step whose type defined by the definition information 111 is the common type "after other category", out of the job steps included in the retry job 221, posterior to a job step whose type defined by the definition information 111 is another type in the running sequence. The job steps whose type defined by the definition information 111 is another type include not only job steps whose type defined by the definition information 111 is a type "negative", but also job steps for which no type is defined by the definition information 111.

In this manner, in the embodiment, there is one type "after other category" as a type defined by the definition information 111. The one type "after other category" is a type to make the control part 203 place a job step whose type defined by the definition information 111 is the one type, out of the job steps included in the retry job 221, posterior to a job step whose type defined by the definition information 111 is another type in the running sequence. The type "after other category" is a type to make the control part 203 include a job step anterior to the restarting step in the running sequence defined by the definition information 111 and whose type defined by the definition information 111 is the one type in the retry job 221.

As illustrated in FIG. 6, a retry type "negative" is specified for the job step category "part of transaction".

In this manner, in the embodiment, the type defined by the definition information 111 for job steps of executing transaction process out of the plurality of job steps is a common type "negative".

If there is a job step corresponding to or anterior to the restarting step in the running sequence defined by the definition information 111 and whose type defined by the definition information 111 is the common type "negative" is not included in the plurality of job steps, the control part 203 excludes a job step posterior to the restarting step in the running sequence defined by the definition information 111 and whose type defined by the definition information 111 is the common type "negative" from the retry job 221.

In this manner, in the embodiment, the types to be defined by the definition information 111 include one type "negative". The one type "negative" is a type to, if a job step corresponding to or anterior to the restarting step in the running sequence defined by the definition information 111 and whose type defined by the definition information 111 is the one type is not included in the plurality of job steps, make the control part 203 exclude a job step posterior to the restarting step in the running sequence defined by the definition information 111 and whose type defined by the definition information 111 is the one type from the retry job 221.

In the embodiment, the reception part 201 reads contents of the job definition statements as in the example from FIG. 4 to FIG. 6.

The execution part 202 executes a starting process and an ending process for jobs based on the job definition statements read by the reception part 201 and the job run information 211. The execution part 202 further executes the starting process and the ending process of the job steps in the job. The execution part 202 changes the contents of the job run information 211 after every execution of the starting process and the ending process for the job step.

The abnormal state action control part 231 of the control part 203 controls an action of a job to be taken after an abnormal end of a certain job step based on the job run information 211. The retry action control part 232 of the control part 203 receives an input of the retry run command 131 from the user with using the input device 903. Upon the input of the retry run command 131, the retry action control part 232 generates the retry job 221 as an example in FIG. 7 on the memory based on the job run information 211 and starts the execution part 202. This memory is a memory to be mounted on the job management apparatus 200, and the retry job 221 is eventually deployed in a memory provided on the DBMS 103 by the execution part 202 and is run by the DBMS 103. In other words, the execution part 202 indirectly runs the retry job 221 with using the DBMS 103 in the embodiment. Note that the execution part 202 may directly run the retry job 221.

The retry job 221 includes information for determining a running sequence of the job steps to be run and identifiers of the respective job steps. In the example in FIG. 7, the retry job 221 includes a row in the form of jobstepid="job step identifier". The description order of the job step identifiers corresponds to the running sequence of the job steps in the retry job 221.

Description of Actions

Referring to FIG. 8 to FIG. 13, actions of the job management apparatus 200, which is an apparatus of the embodiment will be described. The actions of the job management apparatus 200 correspond to a job management method of the embodiment. The actions of the job management apparatus 200 correspond to a job management program procedure of the embodiment.

Figure 8:
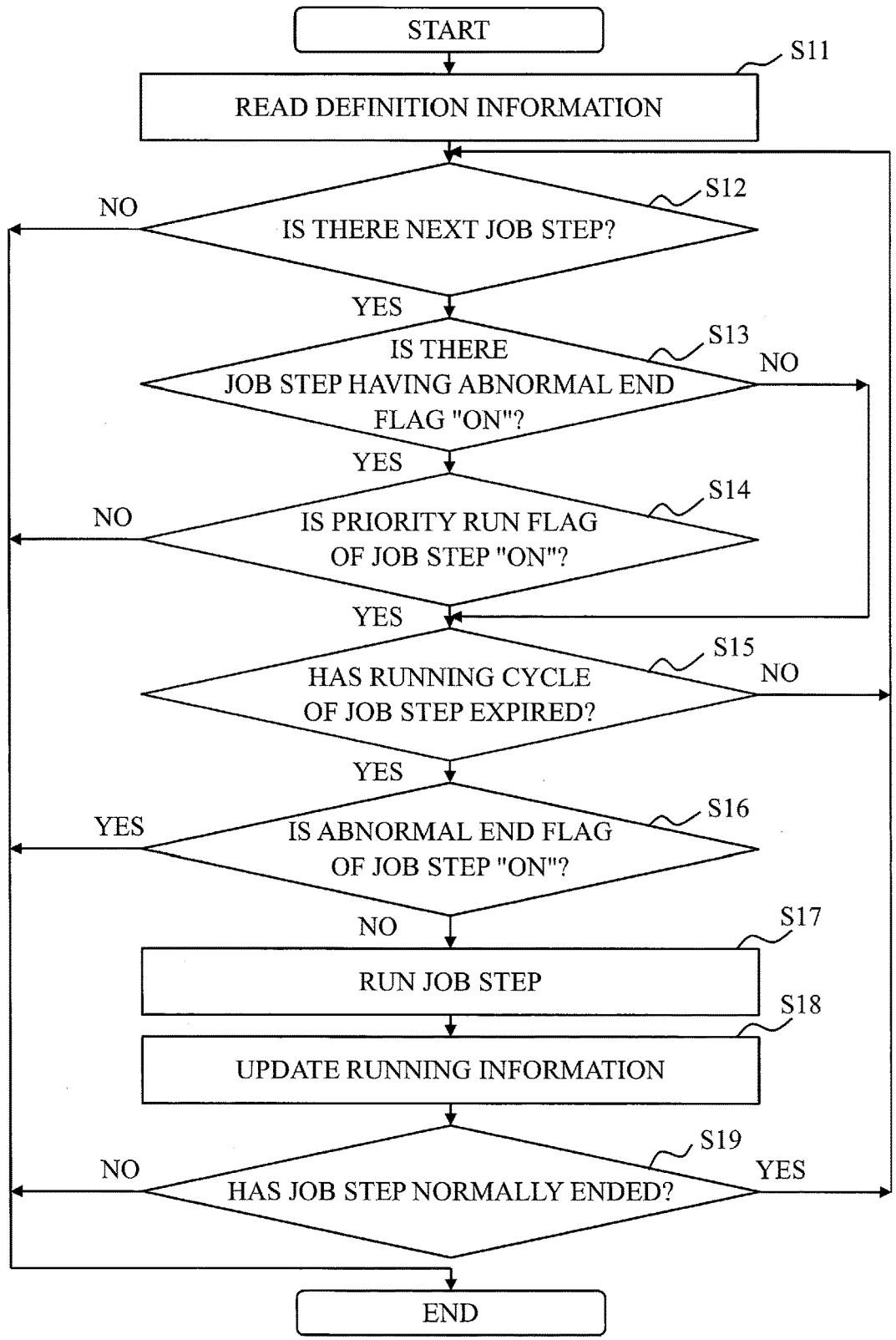
FIG. 8 is a flowchart illustrating a normal action of the job management apparatus according to the first embodiment.

FIG. 8 illustrates a normal action flow of the job management apparatus 200.

In Step S11, the reception part 201 provides the execution part 202 with the definition information 111 that defines a job. Specifically, the reception part 201 receives one or more files including the definition information 111 with using the communication device 904. The reception part 201 stores the received file in the storage device 902. The reception part 201 inputs address information of the file stored in the storage device 902 to the execution part 202. The execution part 202 acquires a file specified by the address information input from the reception part 201. The execution part 202 reads the definition information 111 included in the acquired file.

In Step S12, the execution part 202 refers the definition information 111 read in Step S11 and determines whether or not there are job steps which are not run yet. If there are job steps which are not run yet, the execution part 202 reads the first job step in the running sequence out of the job steps which are not run. In other words, the execution part 202 selects the next job step in the running sequence defined by the definition information 111. The flow goes to Step S13. If there is no job step which is not run yet, the flow ends.

In Step S13, the execution part 202 queries the abnormal state action control part 231 regarding whether there exists a job step having an abnormal end flag "on" or not. The abnormal state action control part 231 refers the job run information 211 and returns a query result to the execution part 202. The execution part 202 refers to the query results. If there exists a job step having the abnormal end flag "on", the flow goes to Step S14. If there is no job step having the abnormal end flag "on", the flow goes to Step S15.

In the step S14, the execution part 202 refers the definition information 111 read in Step S11. If a priority run flag of the job step to be run is "on", the flow goes to Step S15. If the priority run flag of the job step to be run is "off", the flow ends. As used herein the term "job step to be run" is intended to mean a job step selected in Step S12.

In Step S15, the execution part 202 refers to the definition information 111 and the job run information 211 read in Step S11, and determines whether or not the interval between runs of the job step to be run is equal to or larger than a difference between the startup time of the currently running job and the job startup time at the previous run of the corresponding job step or not. If the difference between the startup time of the currently running job and the job startup time at the previous run of the corresponding job step is equal to or larger than the interval between runs of the corresponding job step, the execution part 202 determines that the running cycle of the corresponding job step has expired. The flow goes to Step S16. If the difference between the startup time of the currently running job and the job startup time at the previous run of the corresponding job step is smaller than the interval between runs of the corresponding job step, the execution part 202 determines that the running cycle of the corresponding job step has not expired. The flow returns to Step S12.

In Step S16, the execution part 202 queries the abnormal state action control part 231 regarding whether an abnormal end flag of the job step to be run is "on" or not. The abnormal state action control part 231 refers the job run information 211 and returns a query result to the execution part 202. The execution part 202 refers to the query results. If the abnormal end flag of the corresponding job step is "on", the flow ends. If the abnormal end flag of the corresponding job step is "off", the flow goes to Step S17.

In Step S17, the execution part 202 runs the job step selected in Step S12. The flow goes to Step S18.

In Step S18, the execution part 202 refers to the result of the run of the job step in Step S17, and updates the run information 212 of the corresponding job step included in the job run information 211. Specifically, if the result of the run of the job step in Step S17 is a normal end, the execution part 202 replaces the job startup time at the previous run in the run information 212 of the corresponding job step with the startup time of the currently running job. If the result of the run of the corresponding job step is an abnormal end, the execution part 202 turns the abnormal end flag of the run information 212 of the corresponding job step "on". The execution part 202 also replaces the job startup time at the abnormal end in the run information 212 of the corresponding job step with the startup time of the currently running job. The flow goes to Step S19.

In Step S19, the execution part 202 refers to the result of the run of the job step in Step S17. If the result of the run of the corresponding job step is a normal end, the flow returns to Step S12. If the result of the run of the corresponding job step is an abnormal end, the flow ends.

Figure 9:
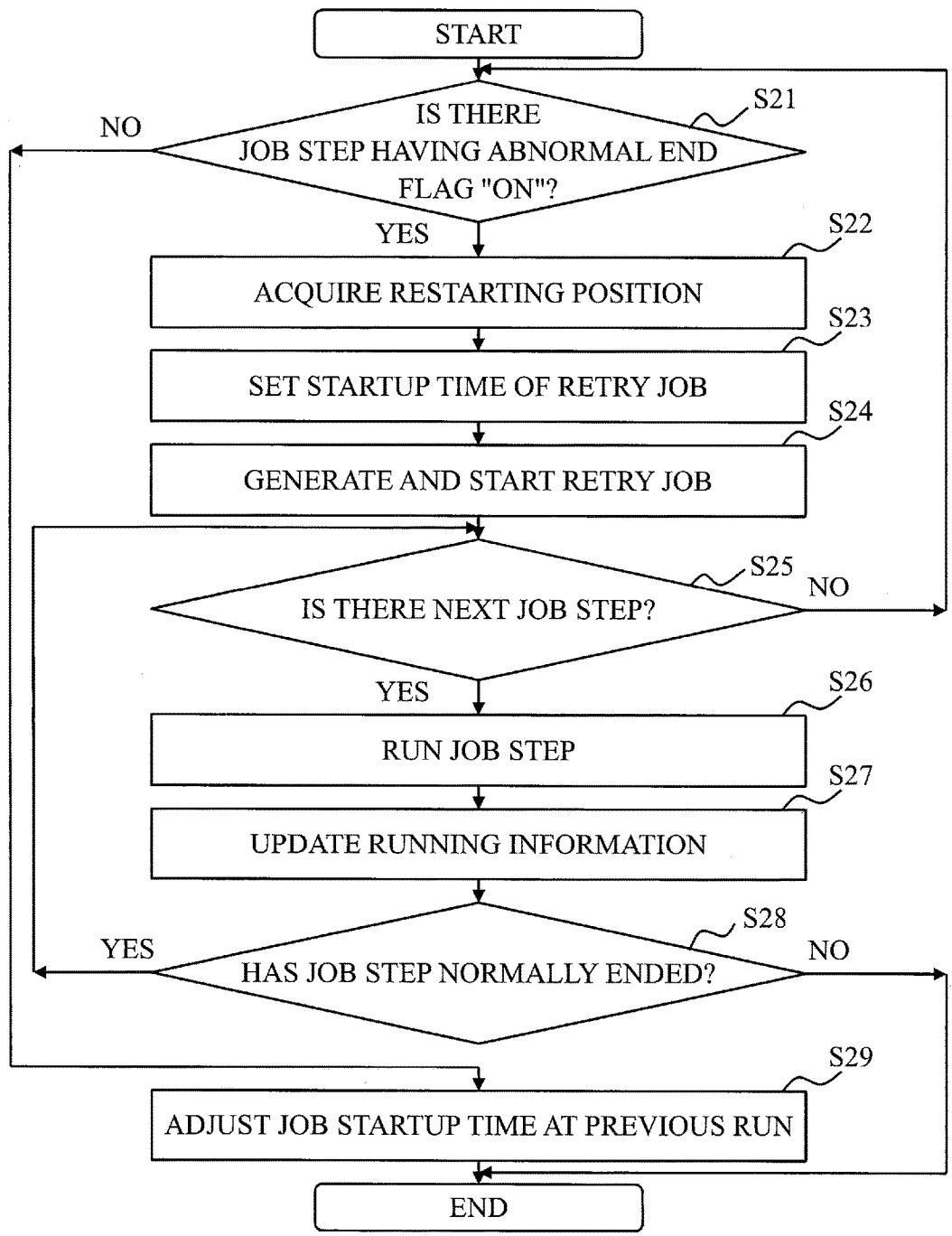
FIG. 9 is a flowchart illustrating a retry action of the job management apparatus according to the first embodiment.

FIG. 9 illustrates a flow of the retry action of the job management apparatus 200.

The retry action control part 232 starts in response to the retry run command 131. At the time of startup, the retry action control part 232 acquires address information of the file stored in the storage device 902 in Step S11 from the execution part 202. The retry action control part 232 reads the definition information 111 included in a file specified by the acquired address information.

In Step S21 the retry action control part 232 refers the job run information 211 and determines whether or not there is any job step having the abnormal end flag "on" in the job specified by the retry run command 131. If there is a job step having the abnormal end flag "on" in the job specified by the retry run command 131, the flow goes to Step S22. If there is no job step having the abnormal end flag "on" in the job specified by the retry run command 131, the flow goes to Step S29.

In Step S22, the retry action control part 232 refers to the job run information 211, and acquires the last job step in the running sequence out of the job steps having the abnormal end flag "on" in the job specified by the retry run command 131 as a restarting position. The flow goes to Step S23.

In Step S23, the retry action control part 232 refers to the job run information 211, and acquires job startup time at the abnormal end in the run information 212 for the job step corresponding to the restarting position as startup time of the retry job 221. The flow goes to Step S24. The job step corresponding to the restarting position corresponds to the restarting step described above.

In the step S24, the retry action control part 232 refers to the job run information 211 and the definition information 111 and generates the retry job 221. The retry action control part 232 starts the retry job 221. Specifically, the retry action control part 232 starts the execution part 202 and makes the execution part 202 run the retry job 221.

In Step S25, the execution part 202 determines whether or not there are job steps which are not run yet in the same manner as Step S12 in the normal action. If there are job steps which are not run yet, the execution part 202 reads the first job step in the running sequence out of the job steps which are not run. In other words, the execution part 202 selects the next job step in the running sequence in the retry job 221. The flow goes to Step S26. If there is no job step which is not run yet, the flow returns to Step S21.

Actions in Step S26 and Step S27 are the same as Step S17 and Step S18 of the normal action.

In Step S28, the execution part 202 refers to the result of the run of the job step in Step S26 in the same manner as in Step S19 of the normal action. If the result of the run in the corresponding job step is a normal end, the flow returns to Step S25. If the result of the run of the corresponding job step is an abnormal end, the flow ends.

In Step S29, if one or more retry jobs 221 are generated in Step S24, the execution part 202 replaces the job startup times at the previous run in all the run information 212 included in the job run information 211 with the current time. Here, a point to align the job startup time at the previous run in all the run information 212 is essential and the job startup time at the previous run in all the run information 212 may be replaced with time different from the current time.

Figure 10:
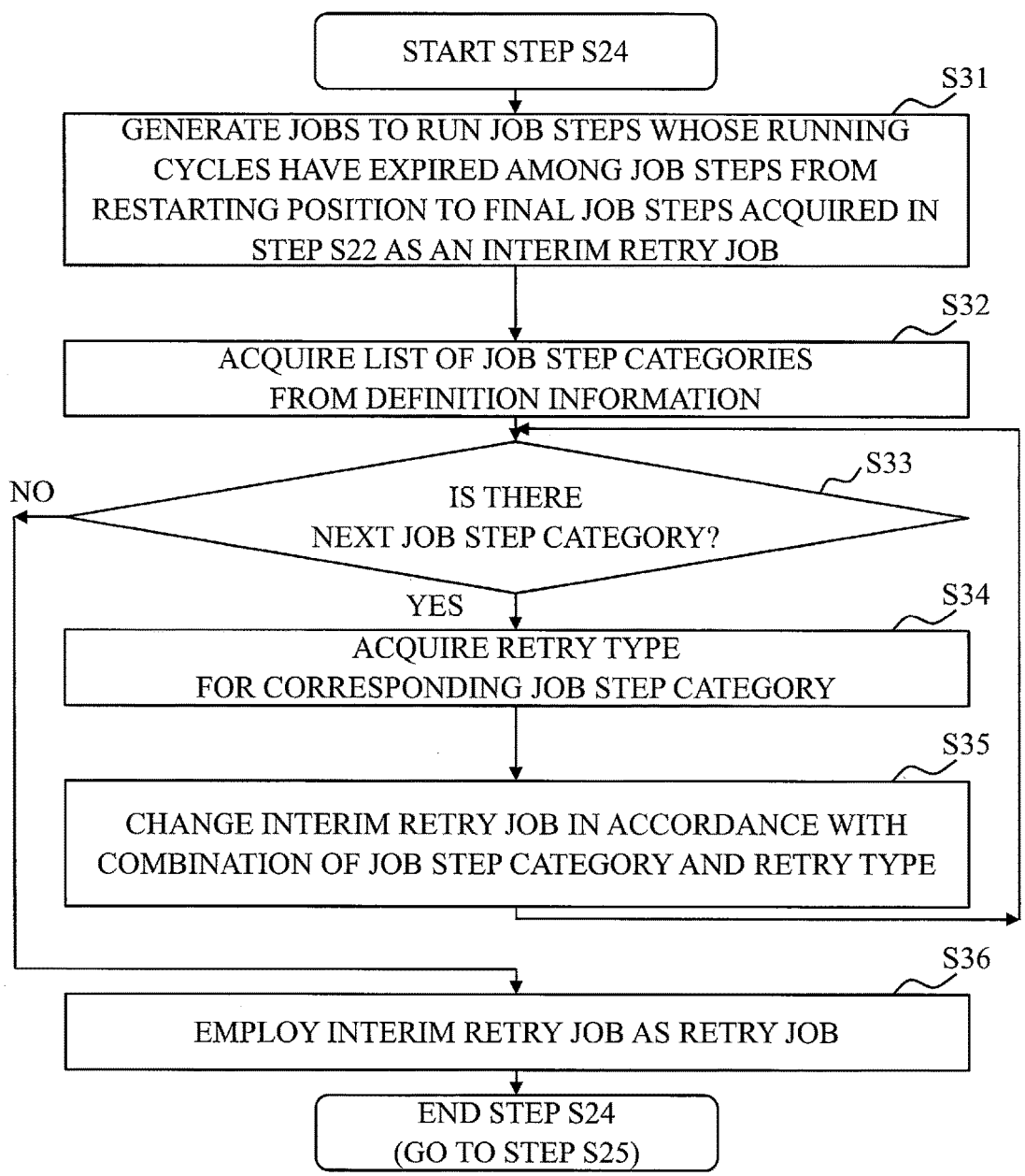
FIG. 10 is a flowchart illustrating Step S24 in FIG. 9 in detail.

Referring now to FIG. 10, detailed description of Step S24 will be described.

In Step S31, the retry action control part 232 generates jobs to run job steps whose running cycles have expired among job steps from the restarting position to the final job steps acquired in Step S22 as interim retry jobs. Whether the running cycle of each job step has expired or not is determined by whether or not the difference between the job startup time at the abnormal end of each job step and the job startup time at the previous run of each job step is equal to or larger than the intervals between runs of the respective job steps. The flow goes to Step S32.

In the step S32, the retry action control part 232 acquires a list of job step categories included in the definition information 111 read at the time of startup. The flow goes to Step S33.

In Step S33, the retry action control part 232 determines whether there is any job step category on which processes in Step S34 and Step S35 are not executed in the job step categories acquired in Step S32. If there is any job step category on which the processes in Step S34 and Step S35 are not executed, the retry action control part 232 acquires one of these job step categories. In other words, the retry action control part 232 selects the following job step category from the list acquired in Step S32. The flow goes to Step S34. If there is no job step category on which the processes in Step S34 and Step S35 are not executed, the flow goes to Step S36.

In the step S34, the retry action control part 232 refers to the definition information 111 read at the time of startup and acquires a retry type corresponding to the job step category acquired in Step S33. The flow goes to Step S35.

In Step S35, the retry action control part 232 refers to the definition information 111 read at the time of startup, and changes an interim retry job in accordance with the combination of the job step category acquired in Step S33 and the retry type acquired in Step S34. The flow returns to Step S33.

In Step S36, the retry action control part 232 employs the interim retry job as the retry job 221. The flow goes to Step S25.

Figure 11:
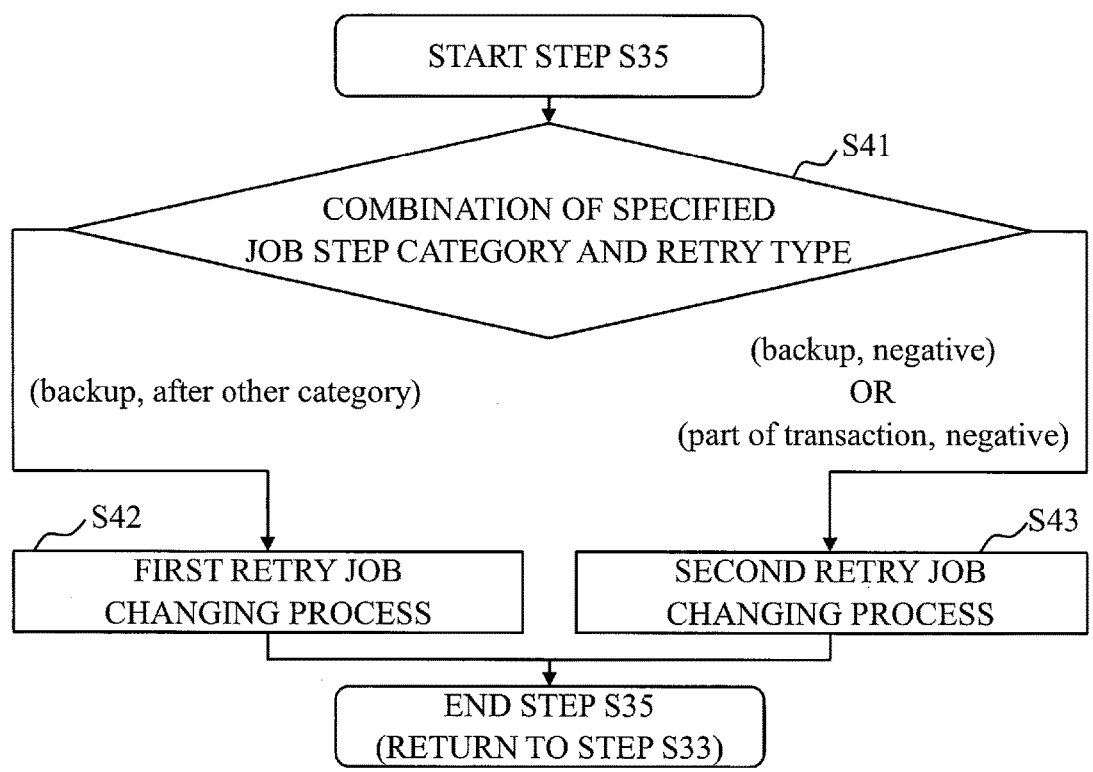
FIG. 11 is a flowchart illustrating Step S35 in FIG. 10 in detail.

Referring now to FIG. 11, detailed description of Step S35 will be described.

In Step S41, the retry action control part 232 goes the flow to Step S42 if the combination of the job step category and the retry type specified in the definition information 111 is a combination of "backup" and "after other category". If the specified combination of the job step category and the retry type is a combination of "backup" and "negative" or a combination of "part of transaction" and "negative", the flow goes to Step S43.

In Step S42, the retry action control part 232 executes a first retry job changing process. The flow returns to Step S33.

The retry action control part 232 runs a second retry job changing process in Step S43. The flow returns to Step S33.

Figure 12:
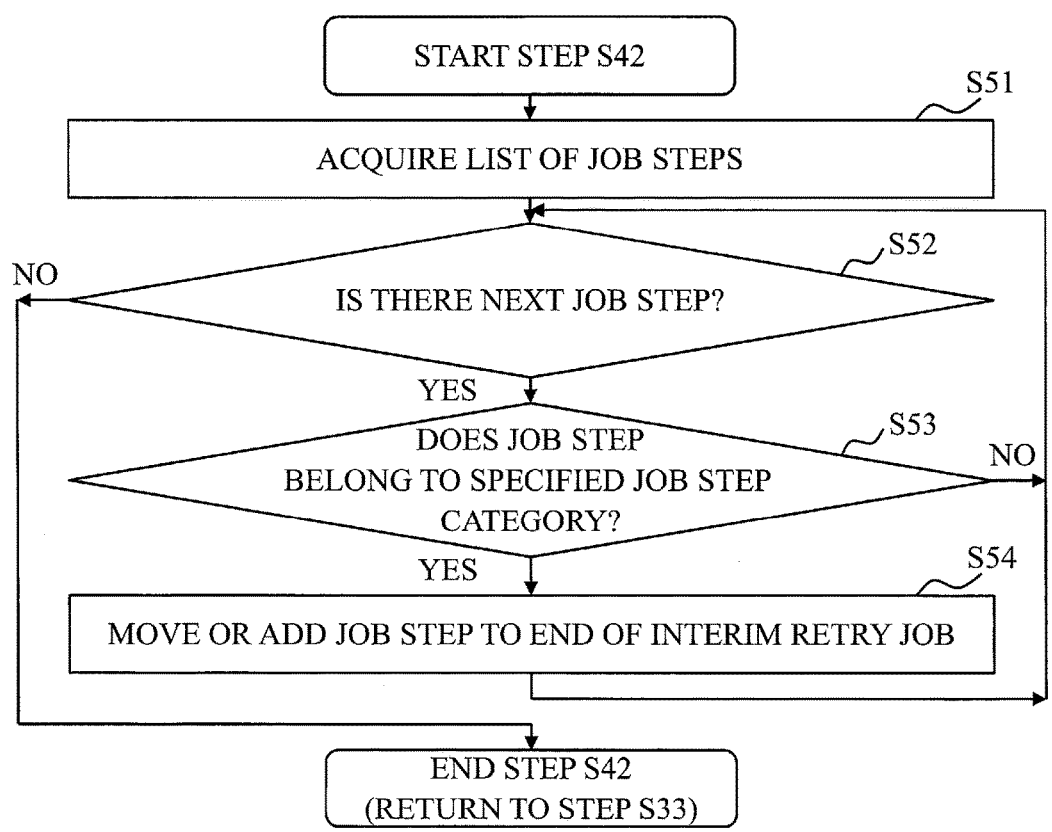
FIG. 12 is a flowchart illustrating Step S42 in FIG. 11 in detail.

Referring now to FIG. 12, detailed description of Step S42 will be given below.

In Step S51, the retry action control part 232 acquires a list of job steps from the definition information 111 read at the time of startup. The flow goes to Step S52.

In Step S52, the retry action control part 232 determines whether there is any job step on which process in Step S53 is not executed in the job step acquired in Step S51. If there is the job step in which the process in Step S53 is not executed, the retry action control part 232 acquires the first job step in the running sequence out of such job steps. In other words, the retry action control part 232 selects the following job step from the list acquired in Step S51. The flow goes to Step S53. If there is no job step on which the processes in Step S53 is not executed, the flow returns to Step S33.

In Step S53, the retry action control part 232 determines whether the job step acquired in Step S52 belongs to the specified job step category. If the job step acquired in the step S52 belongs to the specified job step category, the flow goes to Step S54. When the job step acquired in Step S52 does not belong to the specified job step category, the flow returns to Step S52.

In Step S54, if the job step acquired in Step S52 is already included in the interim retry job, the retry action control part 232 moves the corresponding job step to the rear of the interim retry job. If the job step acquired in Step S52 is not included in the interim retry job, the retry action control part 232 adds the corresponding job step to the rear of the interim retry job. The flow returns to Step S52.

Figure 13:
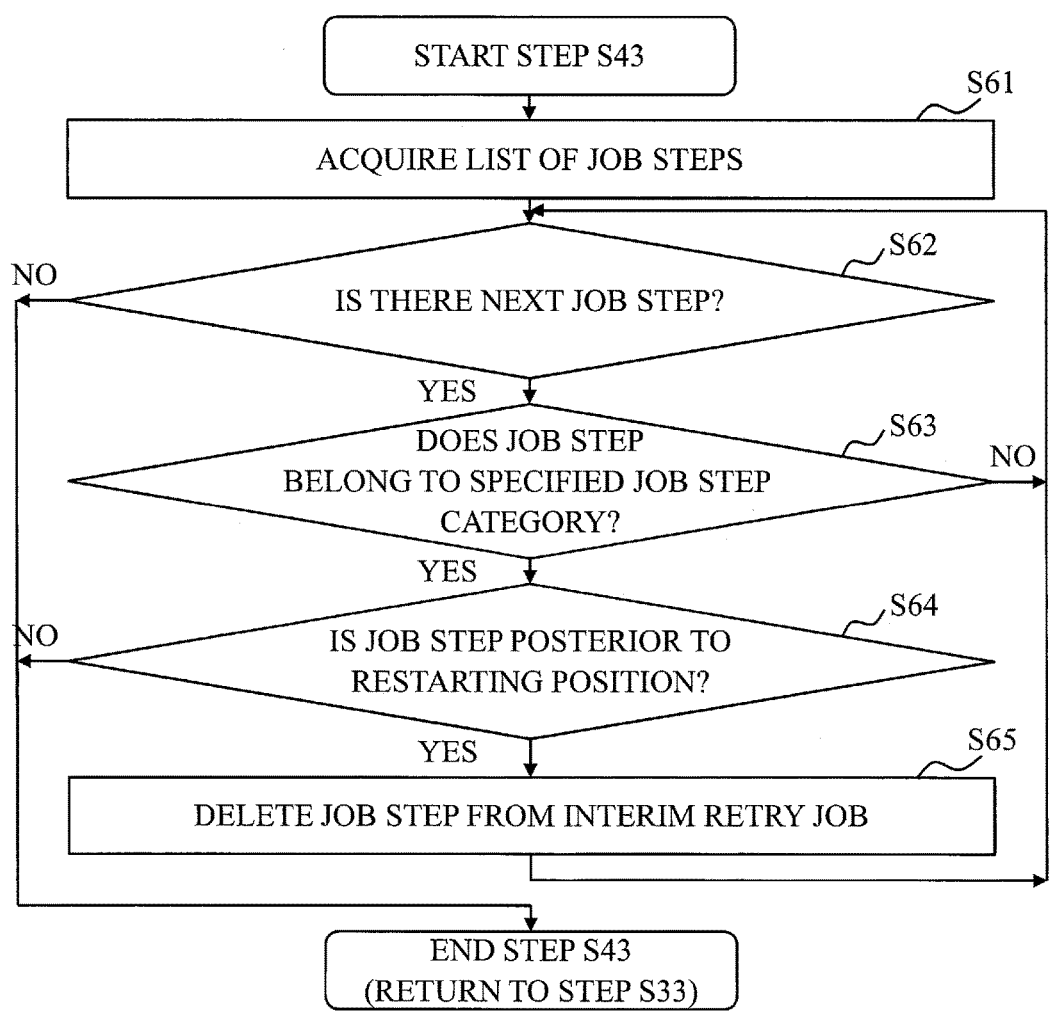
FIG. 13 is a flowchart illustrating Step S43 in FIG. 11 in detail.

Referring now to FIG. 13, detailed description of Step S43 will be given below.

In Step S61, the retry action control part 232 acquires a list of job steps from the definition information 111 read at the time of startup. The flow goes to Step S62.

In Step S62, the retry action control part 232 determines whether there is any job step on which process in Step S63 is not executed in the job steps acquired in Step S61. If there is the job step in which the process in Step S63 is not executed, the retry action control part 232 acquires the first job step in the running sequence out of such job steps. In other words, the retry action control part 232 selects the following job step from the list acquired in Step S61. The flow goes to Step S63. If there is no job step on which the process in Step S63 is not executed, the flow returns to Step S33.

In Step S63, the retry action control part 232 determines whether the job step acquired in Step S62 belongs to the specified job step category. If the job step acquired in the step S62 belongs to the specified job step category, the flow goes to Step S64. When the job step acquired in Step S62 does not belong to the specified job step category, the flow returns to Step S62.

In Step S64, the retry action control part 232 determines whether the job step acquired in Step S62 is posterior to the job step corresponding to the restarting position acquired in Step S22 in the running sequence or not. If the job step acquired in the step S62 is posterior to the job step corresponding to the restarting position in the running sequence, the flow goes to Step S65. If the job step acquired in the step S62 corresponds to or is anterior to the job step corresponding to the restarting position in the running sequence, the flow returns to Step S33.

In Step S65, the retry action control part 232 deletes the job step acquired in Step S62 from the interim retry job. The flow returns to Step S62.

Description of Advantageous Effects of Embodiment

According to the embodiment, even when certain two job steps have a dependency relation, if an abnormal end occurs in the following job step, repeated runs of the job may be continued from the next job onward within a range that does not cause inconsistency in the state of these two job steps according to the definition information 111. Therefore, the job management apparatus 200 according to the embodiment, the job management method, or the data management system 100 to which the job management program is applied may be ensured in safety and enhanced in availability.

In the embodiment, the normal action after an abnormal end of a certain job step may be flexibly changed by the abnormal state action control part 231. Accordingly, availability of the system may be enhanced while maintaining the safety of the data management system 100. The retry action control part 232 is also capable of enhancing efficiency of the retry run.

A case where the contents of the definition information 111 are the same as those illustrated in FIG. 4 to FIG. 6, and the program starting device 107 starts the job management apparatus 200 at a cycle of 5 minutes is exemplified to describe advantageous effects of the embodiment.

FIG. 14 illustrates an example of a result of a run of a job in a case where all job steps are normally ended.

In the embodiment, storage of the state of the run of an abnormally ended job step onward is enabled with using the abnormal end flag. Detailed description will be given below.

It is assumed that an abnormal end occurs at the fourth job step in the job started on October 3, at 0:00. The job is run from the first job step, and overwrites an intermediate file when data is extracted from the accumulation table 104 in the third job step. If the abnormal end flag is eliminated from the embodiment, a problem of loss of data which could not be loaded in the temporary reference table 105 during the job on October 3, at 0:00 may occur. In the embodiment, in the job started on October 3, at 0:00, the occurrence of the abnormal end in the fourth job step is recorded in the abnormal end flag in the process in Step S18. In a job started on October 4, at 01:00, the job is ended before a run of the fourth job step because of the process in Step S16. Therefore, the above-described problem is avoided. In other words, with using the abnormal end flag, the state of the run from the abnormally ended job step onward is stored. Therefore, in the embodiment, the safety of the data management system 100 is enhanced.

In the embodiment, with using the priority run flag in addition to the abnormal end flag, until which job step the procedure is to be run in jobs which are to be run after the abnormal end of a certain job step may be adjusted. Detailed description will be given below.

It is assumed that an abnormal end occurs at the fourth job step in the job started on October 3, at 0:00. When the priority run flag is eliminated from the embodiment, no job step is run when the job is started next time. In the embodiment, the first job step and the second job step are run. In contrast, the third job step is not run. Therefore, the data which could not be loaded in the temporary reference table 105 during the job on October 3, at 0:00 remains in the intermediate file, and thus the state in which an abnormal end occurred in the fourth job step may be stored. In this manner, availability may be enhanced while maintaining the safety of the data management system 100 in the embodiment. As regards a point of enhancement of availability, specifically, even though data loading in the temporary reference table 105 is failed, the action of the data management system 100 is continued, and thus data loss may be prevented. Such a point is effective in equipment data collection and management business in energy management system or the like used widely in recent years.

In the embodiment, when a retry run is desired from the abnormally ended job step after an abnormal end of a certain job step, the job management apparatus 200 acquires the restarting position automatically and generates and runs the retry job 221. Therefore, labors of the user of the data management system 100 such as analyzing a log file or the like to determine the restarting position or manually preparing the retry job 221 may be avoided. Accordingly, in the embodiment, efficiency of the retry run in the data management system 100 may be enhanced.

In the embodiment, when there are a plurality of the abnormally ended job steps, a job step which is abnormally ended at the oldest time in the process of Step S22 is determined as the restarting position. Therefore, the retry run is executed for the job steps in the order of the time of occurrence of the abnormal end in sequence from the oldest. Accordingly, the retry run may be executed with consistency of data stored in the data management system 100. Therefore, in the embodiment, the safety of the data management system 100 is ensured.

In the embodiment, the previous times of execution of all the job steps are aligned in Step S29. Therefore, the dependency relation between job steps indicated by the running cycles may be maintained in a job after the successful retry run. Referring to FIG. 15, detailed description will be given below.

FIG. 15 illustrates an example of a result of a run of a job in a case where Step S29 is eliminated from the embodiment in an upper part, and an example of a result of a run of a job in the embodiment in a lower part.

As illustrated in FIG. 4, the running cycle of the fifth job step is one day. As illustrated in FIG. 6, the running cycle of the twelfth job step is two days. In other words, the running cycle of the twelfth job step is double the running cycle of the fifth job step. Therefore, by the process in Step S15, the dependency relation is established between the fifth job step and the twelfth job step such that in a job in which whenever the twelfth job step is run, the fifth job step is run. In the example in FIG. 15, in a job started on October 2, at 0:00, the first, the fifth, and the twelfth job steps are run. Subsequently, in the job started on October 3, at 0:00, the first and the fifth job steps are run. In the job started on October 3, at 0:00, the running cycle of the twelfth job step has not expired, and hence the twelfth job step is not run yet. After the occurrence of the abnormal end in the first job step in the job started on October 3, at 0:05, the retry run of the corresponding job is executed on October 3, at 0:10. As illustrated in FIG. 4, the job step category of the fifth job step is "backup", and the retry type of the job step category "backup" is "after other category". Therefore, by the process in Step S42, the fifth job step is included in the retry job 221. If the process in Step S29 is omitted at the time of retry run, by the processes of Step S23 and S27, the previous time of execution of the fifth job step after the retry run is October 3, at 0:05, which is the job startup time at the abnormal end of the first job step. In contrast, as illustrated in FIG. 6, the job step category of the twelfth job step is "part of transaction", and the retry type of the job step category "part of transaction" is "negative". Therefore, by the process in Step S43, the twelfth job step is not included in the retry job 221. In other words, the previous time of execution of the twelfth job step remains to be October 2, at 0:00 without change. Therefore, in the example of FIG. 15, in the job started on October 4, at 0:00, the twelfth job step is run even though the fifth job step is skipped. In other words, the dependency relation between the fifth job step and the twelfth job step is broken. If the previous times of execution of all the job steps are aligned in Step S29 at the time of the retry run, such problem does not occur. In the embodiment, by aligning the previous times of execution of all the job steps in Step S29, the dependency relation between the job steps indicated by the running cycles may be maintained in the job after the successful retry run. Therefore, in the embodiment, the safety of the data management system 100 is ensured.

In the embodiment, the startup time of the job when the job step corresponding to the restarting position is abnormally ended is set to the startup time of the retry job 221 by the process in Step S23. Therefore, only job steps which are scheduled to be run when the job step corresponding to the restarting position is abnormally ended are allowed to be run by the process in Step S26. Accordingly, in the embodiment, efficiency of the retry run in the data management system 100 may be enhanced.

In the embodiment, the job management apparatus 200 is capable of flexibly controlling the action at the retry run with using the retry action definition 122. Accordingly, in the embodiment, efficiency of the retry run in the data management system 100 may be enhanced. The retry action definition 122 will be described by retry type in detail below.

The retry type "negative" has an effect of enhancing the efficiency of the retry run and reducing the running period at the time of the retry run by skipping job steps which are not necessary to be run at the retry run. In the case of the job definition statements illustrated in FIG. 4 to FIG. 6, the job step category of the fourth job step, the seventh job step, and the tenth to twelfth job steps is "part of transaction". The retry type of the job step category "part of transaction" is set to "negative". Therefore, when executing a retry run after the occurrence of the abnormal end of the first job step which executes a process for the accumulation table 104, the fourth job step, the seventh job step, and the tenth to the twelfth job steps for executing a process for the temporary reference table 105 or the reference table 106 are skipped. The reason is that consistency of the respective tables is maintained even when the fourth job step, the seventh job step, the tenth to the twelfth job steps are not run.

The retry type "after other category" also has an effect of enhancing the retry run. Detailed description will be given below.

It is assumed that an abnormal end of the third job step occurs on October 3, at 0:00, and a retry run is executed on October 3, at 1:05 in a state in which the job is run until October 3, at 1:00. In the case of the job definition statements illustrated in FIG. 4 to FIG. 6, a job step category of the second job step, the fifth job step, and the eighth job step is "backup". The retry type of the job step category "backup" is set to "after other category". When it is assumed that the job step category "backup" is not set, contents of the retry job 221 that the job management apparatus 200 generates when executing a retry run on October 3, at 1:05 will be as illustrated in an upper part in FIG. 16. In other words, the retry job 221 is a job that runs the third, the fourth, the fifth, the sixth, the eighth, and the ninth job steps in sequence. When the retry job 221 is run, inconsistency occurs between a result of backup of the accumulation table 104 run in the second job step on October 3, at 0:00 and a result of backup of the temporary reference table 105 run in the fifth job step of the retry job 221 on October 3, at 1:05. The reason is as follows.

Although the result of the backup of the accumulation table 104 executed in the second job step on October 3, at 0:00 includes data up to on October 3, at 0:00 only, data is loaded in the accumulation table 104 by the first job step until October 3, at 1:00. Therefore, when executing the retry run on October 3, at 1:05, there is data from October 3, at 0:00 to October 3, at 1:00 in the accumulation table 104. At the time of the retry run on October 3, at 1:05, data from on October 3, at 0:00 to October 3, at 1:00 is extracted from the accumulation table 104 as a difference in the third job step, and is loaded in the temporary reference table 105 in the fourth job step. If an increment backup of the temporary reference table 105 is taken in the fifth job step in the retry job 221 on October 3, at 1:05, the result of the increment backup of the temporary reference table 105 includes data from on October 3, at 0:00 to October 3, at 1:00. As this data is not included in the result of the backup of the accumulation table 104 executed in the second job step, inconsistency may result.

As a simple method for preventing occurrence of the inconsistency as described above, there is a method in which a user of the data management system 100 refers to a log file or the like of the job management apparatus 200 to figure out that an abnormal end occurred in the third job step on October 3, at 0:00 and executes a retry run manually from the third job step. However, there is a problem that efficiency of the retry run is low.

Figure 16:
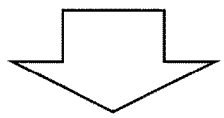
FIG. 16 is a drawing illustrating an example of a retry job generated by the job management apparatus according to the first embodiment.

In the embodiment, the retry job 221 that the job management apparatus 200 generates when executing a retry run on October 3, at 1:05 has contents as illustrated in the lower part of FIG. 16. In other words, the retry job 221 is a job for running the third, the fourth, the sixth, the ninth, the second, the fifth, and the eighth job steps in sequence. If the retry job 221 is run on October 3, at 1:05, data from on October 3, at 0:00 to October 3, at 1:00 is extracted as a difference from the accumulation table 104 by the third job step, and is loaded in the temporary reference table 105 in the fourth job step, and then the second, the fifth, and the eighth job steps are run. Therefore, consistency between the backup of the accumulation table 104 and the backup of the temporary reference table 105 is ensured. In addition, since the job management apparatus 200 generates and runs the retry job 221 automatically, efficiency is higher than the method of executing the retry run manually.

In this embodiment, the process of Step S64 is executed for maintaining a first dependency relation in which whenever a preceding job step is run in a certain job, a following job step is also run. An example of a job including a job step in a job step category "part of transaction" for extracting data from a table of data base and overwriting the data in a temporary file, a job step for converting the extracted data and overwriting the data in a temporary file, and a job step in a job step category "part of transaction" for loading the converted data into another table will be described in detail.

It is assumed that an abnormal end occurs in the job step for conversion when the job is started at a certain time. If the process in Step S64 does not exist, the retry job 221 generated at the time of a retry run is a job for running only conversion. If a normal run is executed after running the retry job 221, a problem of loss of converted data remaining as a temporary file without being loaded into the table after the retry run when executing conversion occurs. By executing the process in Step S64, the interim retry job may be prevented from being changed by the process in Step S65 when there is a process of the job step category "part of transaction" before the restarting step.

According to the embodiment, occurrence of inconsistency between the states of two job steps when running the retry job 221 may be prevented by changing the job in accordance with the definition information 111 when generating the retry job 221. Therefore, the safety of the system to which the job management apparatus 200 is applied may be ensured.

Other Configuration

A configuration of a system in which the job management apparatus 200 is applied according to the embodiment is not limited to the data management system 100 as illustrated in FIG. 1. Specifically, the job management apparatus 200 may be applied to a system that uses one or more tables different from the accumulation table 104, the temporary reference table 105, and the reference table 106.

In the embodiment, the function of the job management apparatus 200 is realized by software. However, the function of the job management apparatus 200 may be realized by hardware as a modification. A difference of the modification from the embodiment will mainly be described.

Figure 17:
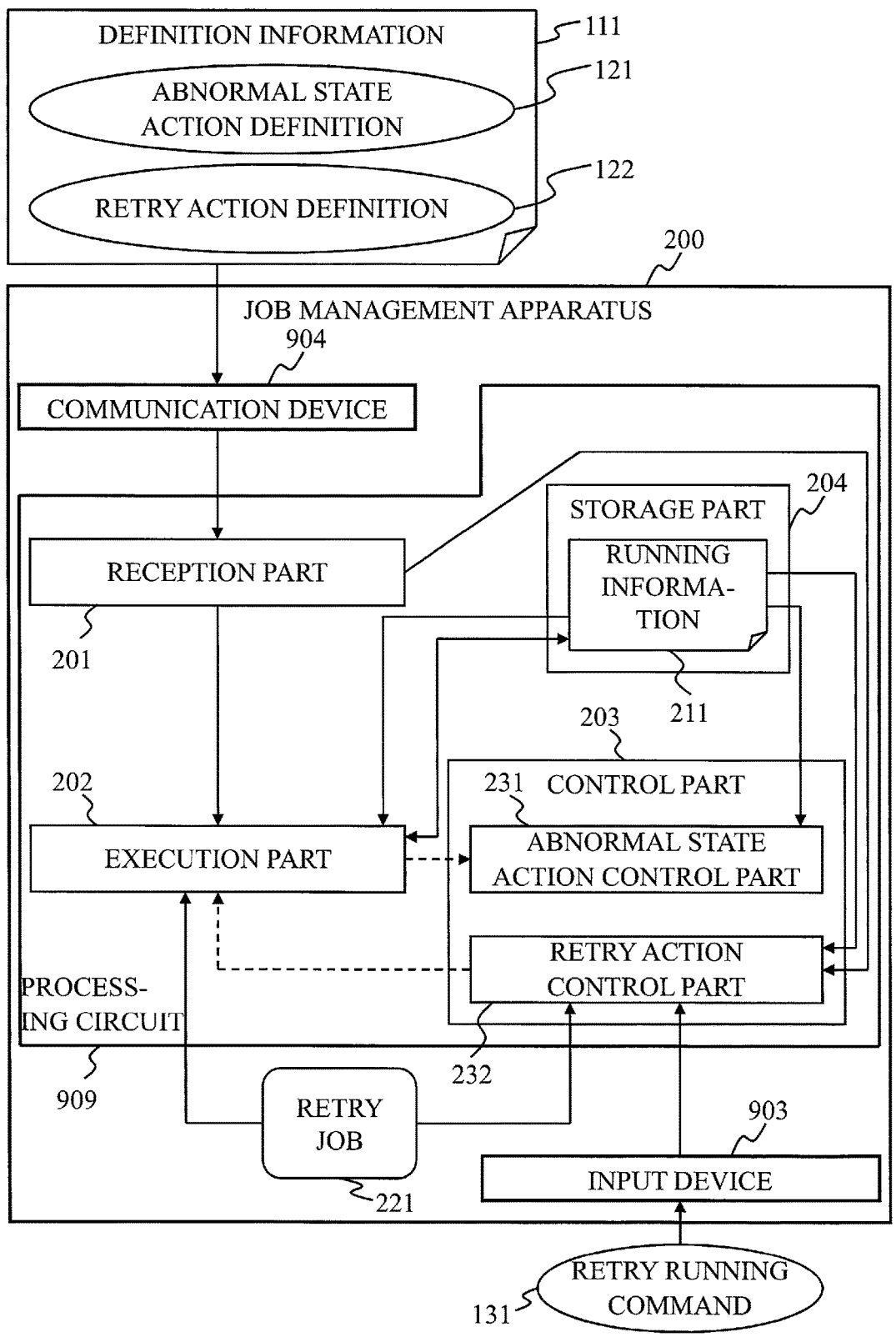
FIG. 17 is a block diagram illustrating a configuration of a job management apparatus according to a modification of the first embodiment.

Referring to FIG. 17, a configuration of the job management apparatus 200 according to a modification of the embodiment will be described.

The job management apparatus 200 includes hardware such as a processing circuit 909, an input device 903, and a communication device 904.

The processing circuit 909 is a specific electronic circuit to realize the functions of the above-described "part" and the storage part 204. Specific examples of the processing circuit 909 include a single circuit, a composite circuit, a programmed processor, a parallel programmed processor, a logic IC, gate array (GA), application specific integrated circuit (ASIC) or field-programmable gate array (FPGA).

The functions of the "part" and the storage part 204 may be realized by one processing circuit 909, or may be realized dispersedly by a plurality of the processing circuits 909.

As another modification, the function of the job management apparatus 200 may be realized by a combination of software and hardware. In other words, a configuration in which the function of part of the job management apparatus 200 is realized by specific hardware and the remaining function is realized by software is also applicable.

The processor 901, the storage device 902, and the processing circuit 909 are generally referred to as "processing circuitry". In other words, irrespective of whether the configuration of the job management apparatus 200 has a configuration illustrated in FIG. 2 or FIG. 17, the functions of the "part" and the storage part 204 are realized by a processing circuitry.

The "parts" may be replaced by "processes" or "procedures" or "processing". The functions of the "parts" may be realized by a farm ware.

Although the embodiment of the present invention has been described thus far, the embodiment may partly be implemented as well. Specifically, one of those descried as "part" in the description of the embodiment may be employed, or a given combination thereof may also be employed. The invention is not limited to the embodiment, and various modifications may be made as needed.

REFERENCE SIGNS LIST

100: data management system, 101: data collection device, 102: Data file, 103: DBMS, 104: accumulation table, 105: temporary reference table, 106: reference table, 107: program starting device, 111: definition information, 121: abnormal state action definition, 122: retry action definition, 131: retry run command, 200: job management apparatus, 201: reception part, 202: execution part, 203: control part, 204: storage part, 211: job run information, 212: run information, 221: retry job, 231: abnormal state action control part, 232: retry action control part, 901: processor, 902: storage device, 903: input device, 904: communication device, 909: processing circuit.

The invention claimed is:
1. A job management apparatus comprising:
a processor;
a memory storing instructions which, when executed by the processor, performs a process including
receiving an input of definition information that defines a running sequence and a running condition of a plurality of job steps which correspond to components of a job to be executed by the processor,
upon detection that an abnormal end has occurred in a particular job step included in a job run in accordance with the definition information,
interrupting the running of the job in accordance with the running sequence defined in the definition information;
determining a running sequence of job steps included in a retry job starting with the particular job step as a restarting step, the running sequence for the retry job being determined by selectively including and omitting, as job steps posterior to the restarting step in the determined running sequence, job steps posterior to the particular job step in the running sequence defined by the definition information and satisfying the running condition defined by the definition information at the occurrence of the abnormal end in the restarting step; and
running the retry job according to the running sequence determined for the retry job; and
a second memory to store information, wherein
the definition information includes information that defines an interval between runs of each of the plurality of job steps as the running condition of the plurality of job steps, and
the process further comprises
writing run information that indicates time of a previous run into the second memory for each of the plurality of job steps;
when running the job in accordance with the definition information, running each of the plurality of job steps for which the time period since the time of the previous run indicated by the run information is greater than or equal to the defined interval between runs, and overwriting the time of the previous run indicated by the run information with startup time of the job being run with respect to the run job step; and
when running the retry job, running the job steps included in the retry job along a determined running sequence, and changing the time of the previous run indicated by the run information into common time with respect to the plurality of job steps.

2. The job management apparatus according to claim 1, wherein after the run of the retry job is completed, the process resumes running the restarting step and the other job steps included in the retry run in accordance with the running sequence defined by the definition information.

3. The job management apparatus according to claim 1, wherein
the definition information further includes information that defines types of the plurality of job steps, and
the process determines the running sequence of the job steps included in the retry job in accordance with the types defined by the definition information.

4. The job management apparatus according to claim 3, wherein the types defined by the definition information include one type indicating to the process to place a job step of the one type posterior to a job step of another type defined by the definition information in the determined running sequence.

5. The job management apparatus according to claim 1, wherein
the definition information further includes information that defines types of the plurality of job steps, and
the process determines the job steps to be included in the retry job in accordance with the types defined by the definition information.

6. The job management apparatus according to claim 5, wherein the types defined by the definition information include one type indicating to the process to include a job step, which is anterior to the restarting step in the running sequence defined by the definition information and also of the one type, in the retry job.

7. The job management apparatus according to claim 5, wherein the types defined by the definition information include one type indicating to the process to omit from the retry job a job step of the one type, which is posterior to the restarting step in the running sequence defined by the definition information, if another job step of the one type is either the particular step or anterior to the particular step in the running sequence defined by the definition information.

8. The job management apparatus according to claim 1, wherein
the process further comprises:
writing run information that indicates the occurrence or nonoccurrence of the abnormal end in the second memory for each of the plurality of job steps;
when running the job in accordance with the definition information, updating the run information with information that indicates the occurrence of the abnormal end with respect to the particular job step in which the abnormal end has occurred; and
when running the retry job, updating the run information with information that indicates nonoccurrence of the abnormal end, with respect to the restarting step, if no abnormal end occurs, and
when there are multiple job steps for each of which the occurrence of the abnormal end is indicated by the run information, the process repeats the step of generating the retry job by determining one of the multiple job steps posterior in the defined running sequence as the restarting step of the retry job that is initially generated, and running the retry jobs that are repeatedly generated until no job step is indicated by the run information as having the occurrence of the abnormal end therein.

9. The job management apparatus according to claim 1, wherein
the definition information further includes information that defines a job step, which is to be run even when the abnormal end occurs in another job step, out of the plurality of job steps, as a priority step, and
if the abnormal end occurs in the particular job step, the processor stops running a job step, which is anterior to the particular job step in the defined running sequence, and which is not defined as a priority step by the definition information.

10. A job management method comprising:
by a processor,
receiving an input of definition information that defines a running sequence and a running condition of a plurality of job steps which correspond to components of the job to be executed;
upon detection that an abnormal end has occurred in a particular job step included in a job run in accordance with the definition information,
interrupting the running of the job in accordance with the running sequence defined in the definition information;
determining a running sequence of job steps included in a retry job starting with the particular job step as a restarting step, the running sequence for the retry job being determined by selectively including and omitting, as job steps posterior to the restarting step in the determined running sequence, job steps posterior to the particular job step in the running sequence defined by the definition information and satisfying the running condition defined by the definition information at the occurrence of the abnormal end in the restarting step; and
running the retry job according to the running sequence determined for the retry job, wherein
the definition information includes information that defines an interval between runs of each of the plurality of job steps as the running condition of the plurality of job steps, and
the method further comprises, by the processor,
writing run information that indicates time of a previous run into a memory for each of the plurality of job steps;
when running the job in accordance with the definition information, running each of the plurality of job steps for which the time period since the time of the previous run indicated by the run information is greater than or equal to the defined interval between runs, and overwriting the time of the previous run indicated by the run information with startup time of the job being run with respect to the run job step; and
when running the retry job, running the job steps included in the retry job along a determined running sequence, and changing the time of the previous run indicated by the run information into common time with respect to the plurality of job steps.

11. A non-transitory computer readable medium storing a job management program causing a computer to execute a process comprising:
receiving an input of definition information that defines a running sequence and a running condition of a plurality of job steps which correspond to components of the job to be run;
upon detection that an abnormal end has occurred in a particular job step included in a job run in accordance with the definition information,
interrupting the running of the job in accordance with the running sequence defined in the definition information;
determining a running sequence of job steps included in a retry job starting with the particular job step as a restarting step, the running sequence for the retry job being determined by selectively including and omitting, as job steps posterior to the restarting step in the determined running sequence, job steps posterior to the particularly job step in the running sequence defined by the definition information and satisfying the running condition defined by the definition information at the occurrence of the abnormal end in the restarting step as a retry job; and
running the retry job according to the running sequence determined for the retry job, wherein the definition information includes information that defines an interval between runs of each of the plurality of job steps as the running condition of the plurality of job steps, and the process further comprises
- writing run information that indicates time of a previous run into a memory for each of the plurality of job steps;
- when running the job in accordance with the definition information, running each of the plurality of job steps for which the time period since the time of the previous run indicated by the run information is greater than or equal to the defined interval between runs, and overwriting the time of the previous run indicated by the run information with startup time of the job being run with respect to the run job step; and
- when running the retry job, running the job steps included in the retry job along a determined running sequence, and changing the time of the previous run indicated by the run information into common time with respect to the plurality of job steps.

\* \* \* \* \*